United States Patent
Mori et al.

(10) Patent No.: US 12,479,640 B2
(45) Date of Patent: Nov. 25, 2025

(54) PACKAGING BAG

(71) Applicant: Fujimori Kogyo Co., Ltd., Tokyo (JP)

(72) Inventors: Toshihiko Mori, Tokyo (JP); Naoto Fujikawa, Tokyo (JP)

(73) Assignee: ZACROS Corporation, Tokyo (JP)

( * ) Notice: Subject to any disclaimer, the term of this patent is extended or adjusted under 35 U.S.C. 154(b) by 91 days.

(21) Appl. No.: 18/034,236

(22) PCT Filed: Oct. 28, 2021

(86) PCT No.: PCT/JP2021/039911
§ 371 (c)(1),
(2) Date: Apr. 27, 2023

(87) PCT Pub. No.: WO2022/092237
PCT Pub. Date: May 5, 2022

(65) Prior Publication Data
US 2023/0391526 A1    Dec. 7, 2023

(30) Foreign Application Priority Data

Oct. 30, 2020   (JP) .................................. 2020-182473

(51) Int. Cl.
*B65D 75/00*  (2006.01)
*B32B 27/08*  (2006.01)
(Continued)

(52) U.S. Cl.
CPC ............ *B65D 75/008* (2013.01); *B32B 27/08* (2013.01); *B32B 27/32* (2013.01); *B65D 75/26* (2013.01);
(Continued)

(58) Field of Classification Search
CPC ......................... B65D 75/008; B65D 2207/00
(Continued)

(56) References Cited

U.S. PATENT DOCUMENTS

2021/0023828 A1    1/2021   Yamada et al.

FOREIGN PATENT DOCUMENTS

| | | | |
|---|---|---|---|
| CN | 105059687 A | 11/2015 | |
| GB | 2081214 A | * 2/1982 | ............. B65D 31/02 |

(Continued)

OTHER PUBLICATIONS

Seki (Year: 2019).*

(Continued)

*Primary Examiner* — Nathan J Newhouse
*Assistant Examiner* — Nina K Attel
(74) *Attorney, Agent, or Firm* — Harris Beach Murtha Cullina PLLC

(57) ABSTRACT

A packaging bag has a bottom member folded in half along a folding line and sandwiched between two body members. Body seal portions with surfaces of the body members joined along left and right circumferential edge portions of the packaging bag are formed on a side above the folding line. A bottom seal portion with an inner surface of the bottom member joined to the inner surfaces of the body members is formed on a side below the folding line. An unsealed portion surrounded by the body seal portions and the bottom seal portion accommodates a content. Resin layers of the body members and the bottom member are formed of a polyethylene-based resin film. Boundary portions between the bottom seal portion and the unsealed portion have a convex shape toward the upper side of the packaging bag near a part in contact with the body seal portions.

4 Claims, 1 Drawing Sheet

(51) Int. Cl.
  *B32B 27/32* (2006.01)
  *B65D 75/26* (2006.01)
(52) U.S. Cl.
  CPC ..... *B32B 2250/02* (2013.01); *B32B 2250/242* (2013.01); *B32B 2307/31* (2013.01); *B32B 2439/46* (2013.01); *B65D 2207/00* (2013.01)
(58) Field of Classification Search
  USPC .......................................................... 383/104
  See application file for complete search history.

(56) References Cited

FOREIGN PATENT DOCUMENTS

| JP | 53125174 A | 11/1978 |
|---|---|---|
| JP | 10129690 A | 5/1998 |
| JP | 2001114296 A | 4/2001 |
| JP | 2014061915 A | 4/2014 |
| JP | 2016034848 A | 3/2016 |
| JP | 2019131225 A | 8/2019 |
| JP | 2019182481 A | 10/2019 |
| JP | 2020157729 A | 10/2020 |
| TW | 477771 B | 3/2002 |
| WO | 2019189092 A1 | 10/2019 |

OTHER PUBLICATIONS

Saito (Year: 2020).*
A Bag Body Manufacturing Apparatus (Year: 2018).*
International Search Report for Application No. PCT/JP2021/039911 dated Jan. 11, 2022 with English translation.
European Search Report for Application No. 21886354.6 dated Sep. 4, 2024.
Search Report from Chinese Patent Office for Application No. 202180073633.3 dated Mar. 27, 2025 (translation provided).

* cited by examiner

PACKAGING BAG

FIELD OF THE INVENTION

The present invention relates to a packaging bag.

BACKGROUND OF THE INVENTION

Japanese Unexamined Patent Application, First Publication No. H10-129690 discloses a packaging bag constituted to have a mountain-folded bottom member interposed in a lower portion in which a pair of body members face each other. This kind of packaging bag becomes a self-supporting packaging bag (standing pouch) by unfolding a four-ply lower portion including a pair of body members and a mountain-folded bottom member.

SUMMARY OF THE INVENTION

Technical Problem

In composite films used for body members and a bottom member in a packaging bag in the related art, a heat-bondable resin (sealant) layer of a polyethylene (PE) or the like is laminated on an inner surface, and a base material of a polyethylene terephthalate (PET) or the like having higher heat resistance than the sealant is laminated on an outer surface. When heat bonding is performed between the body members or between the body members and the bottom member, inner surfaces of a composite film are joined to each other by melting the sealant.

However, a packaging bag including different kinds of resin has a problem in that it is difficult to recycle it as plastic container packaging.

In recent years, in order to facilitate recycling, mono-material container packaging using a single resin has been proposed. However, according to the studies of the inventors, it has been ascertained that if the same kind of resin as a sealant is laminated as a base material, the strength of a part where a composite film is heat-bonded may deteriorate, particularly, durability when a packaging bag is dropped may deteriorate.

The present invention has been made in consideration of the foregoing circumstances, and an object thereof is to provide a packaging bag exhibiting excellent durability even if it is a mono-material self-supporting packaging bag (standing pouch).

Solution to Problem

In order to resolve the problem, the present invention provides a packaging bag in which a bottom member folded in half along a folding line is sandwiched between a pair of body members. Body seal portions in which inner surfaces of the pair of body members are joined to each other along left and right circumferential edge portions of the packaging bag are formed on a side above the folding line in the packaging bag. A bottom seal portion in which an inner surface of the bottom member is joined to the inner surfaces of the body members is formed on a side below the folding line in the packaging bag. An unsealed portion surrounded by the body seal portions and the bottom seal portion is capable of accommodating a content. Resin layers of the body members and the bottom member are formed using a film made of only a polyethylene-based resin. A boundary portion of the bottom seal portion with respect to the unsealed portion has a convex shape toward the upper side of the packaging bag near a part in contact with the body seal portions.

The film may be a lamination film having a sealant layer laminated on an inner surface of the film, and a base material layer laminated on an outward side of the sealant layer in a thickness direction of the film. The sealant layer may be formed of an unstretched polyethylene-based resin, and the base material layer may be formed of a stretched polyethylene-based resin.

The boundary portion of the bottom seal portion with respect to the unsealed portion may have a convex shape toward the lower side of the packaging bag in a central portion of the packaging bag in a lateral direction.

In the bottom member, outer surfaces of the bottom member may be joined to each other in the left and right circumferential edge portions of the packaging bag.

Advantageous Effects of Invention

According to the present invention, it is possible to provide a packaging bag exhibiting excellent durability at a part where body members and a bottom member are joined even if it is a mono-material self-supporting packaging bag (standing pouch).

DETAILED DESCRIPTION OF THE INVENTION

Hereinafter, on the basis of a preferable embodiment, the present invention will be described with reference to the drawings.

Figure 1:
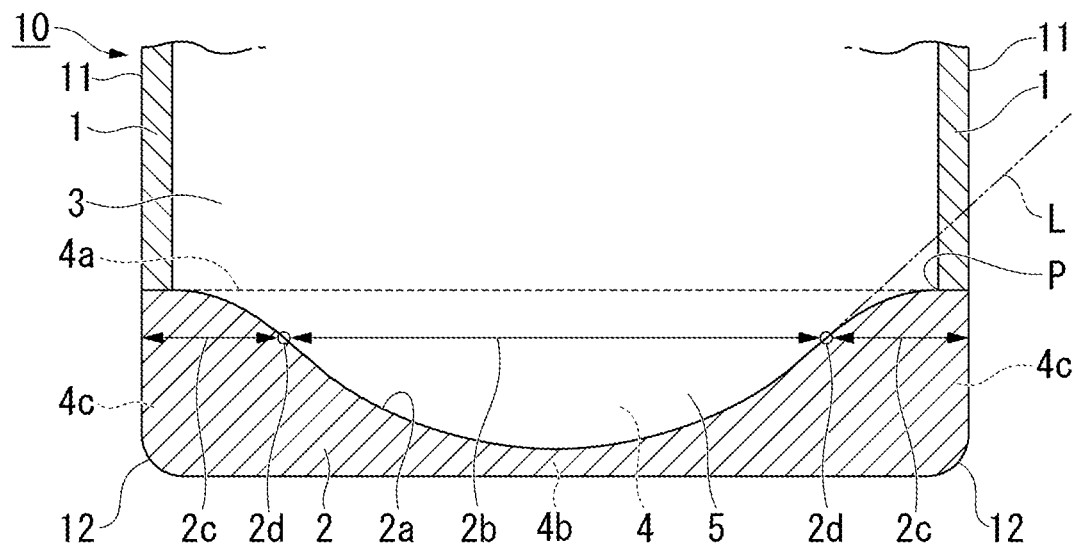
FIG. 1 is a front view illustrating a lower portion of a packaging bag of the present invention.
Figure 2:
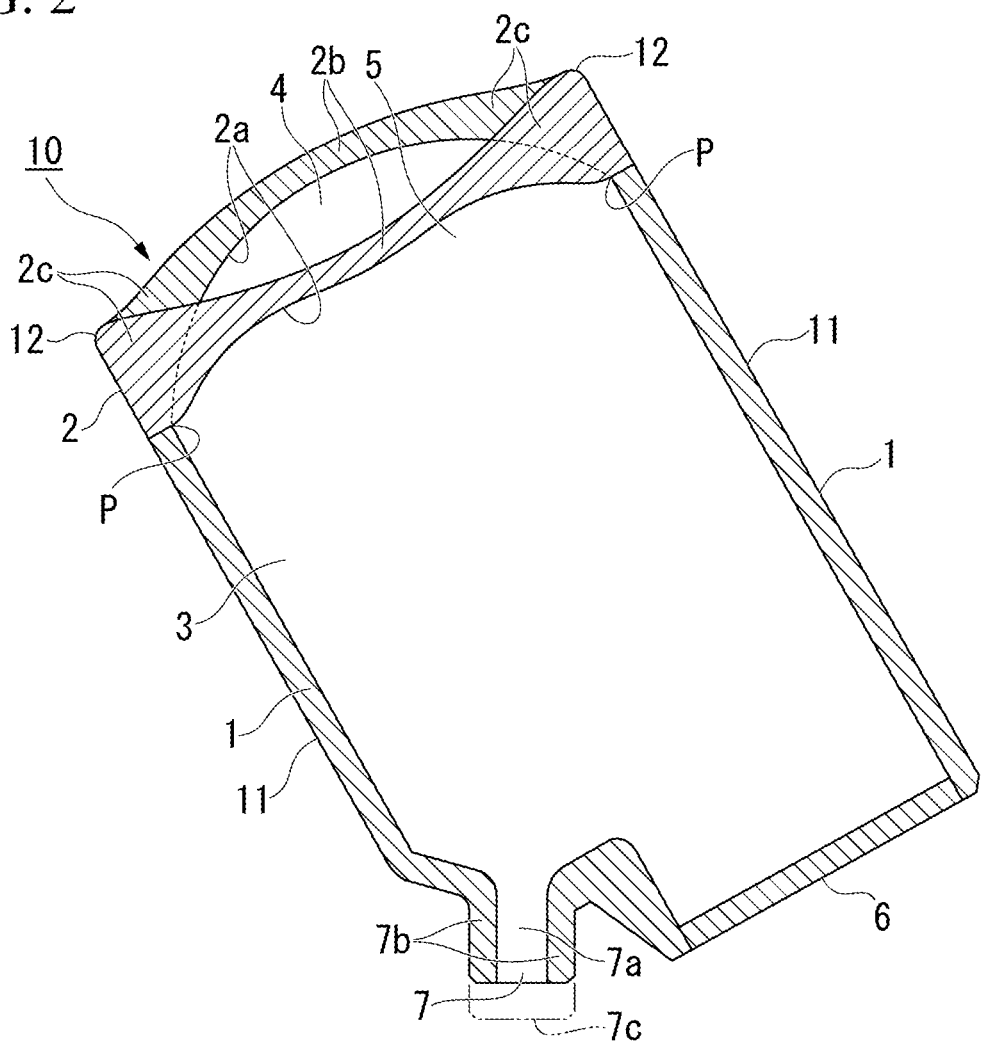
FIG. 2 is a perspective view illustrating an inflated state of the packaging bag of the present invention.

FIG. 1 illustrates a lower portion of a packaging bag 10 of the embodiment. FIG. 2 illustrates an inflated state of the lower portion of the packaging bag 10 of the embodiment. The packaging bag 10 is formed to have a bottom member 4 folded in half along a folding line 4a, and a pair of body members 3 disposed such that the bottom member 4 is sandwiched therebetween.

In the description of the embodiment, in an up-down direction of the packaging bag 10, as illustrated in FIG. 1, a side of the packaging bag 10 including the bottom member 4 will be referred to as a lower side. Plan view in the description of the embodiment corresponds to a state viewed in a direction perpendicular to the paper in a state in which the packaging bag 10 is folded in a substantially flat manner. In plan view, the body members 3 are substantially disposed along the paper of FIG. 1. The upper side of the packaging bag 10 is a side opposite to the side of the packaging bag 10 including the bottom member 4. In plan view, the up-down direction of the packaging bag 10 is substantially perpendicular to a direction in which the folding line 4a extends. The direction in which folding line 4a extends may be referred to as a lateral direction of the packaging bag 10.

In addition, a direction perpendicular to the paper of FIG. 1 may be referred to as a front-rear direction of the packaging bag 10. In the pair of body members 3 sandwiching the bottom member 4, one body member 3 is disposed on a front side, and the other body member 3 is disposed on a rear side. In respect of a structure of the packaging bag 10, it is not necessary to strictly distinguish between the front side and the rear side, but when a display or design is prominent on one side, the prominent side may be referred to as the front side. However, the packaging bag 10 of the embodiment may have a display or design on both the front and rear surfaces or may have plain surfaces.

In the body members 3 and the bottom member 4, a resin layer is formed using a film made of only a polyethylene-based resin. A polyethylene-based resin film may be a single-layer resin film or may be a multi-layer resin film.

A body portion film for forming the body members 3 and a bottom portion film for forming the bottom member 4 may be films having the same material, thickness, or the like or may be films having a different material, thickness, or the like.

In a film for forming the body members 3 or the bottom member 4, a vapor deposition layer, a printed layer, a coated layer, an adhesion layer, or the like may be laminated from a different material to that of the resin layer. The different material includes a metal such as aluminum, an inorganic compound such as silica or alumina, and the like.

In the case of a multi-layer resin film, it may be a lamination film having a sealant layer on an inner surface and having a base material layer on an outward side. A printed layer, a coated layer, an adhesion layer, or the like may include a polymer material other than a polyethylene as a material of an ink, a paint, an adhesive, or the like.

The different material layer may be disposed between the sealant layer and the base material layer of the film or may be disposed on the outward side of the base material layer of the film in a thickness direction. A method for forming a lamination film is not particularly limited and includes dry lamination, extrusion lamination, heat lamination, coextrusion, coating, and the like. Different methods may be used for lamination of respective layers.

The sealant layer is a resin layer disposed on the inner surface of the film. The sealant layer is used for joining the body members 3 in body seal portions 1 to each other and joining the body members 3 and the bottom member 4 in a bottom seal portion 2. It is preferable that the sealant layer be formed of an unstretched polyethylene-based resin. Specific examples of a material for forming the sealant layer include a polyethylene-based resin having a relatively low density, such as a linear low-density polyethylene (LLDPE) or a low-density polyethylene (LDPE).

The base material layer is a resin layer of the film laminated on the outward side of the sealant layer in the thickness direction. The base material layer may be disposed on an outer surface of the film. It is preferable that the base material layer be formed of a stretched polyethylene-based resin. Specific examples of a material for forming the base material layer include a polyethylene-based resin having a relatively high density, such as a medium-density polyethylene (MDPE) or a high-density polyethylene (HDPE).

The polyethylene-based resin described above may be a homopolymer of ethylene or may be a copolymer having ethylene as a main constituent. A monomer (comonomer) other than ethylene includes α-olefins such as 1-butene, 1-hexene, or 1-octene; cyclic olefins such as norbornene; a vinyl-based monomer such as vinyl acetate, vinyl chloride, or acrylic acid; and the like.

When a comonomer is used, one or more kinds thereof may be used. A proportion of ethylene to constituent monomers in a polyethylene-based resin polymer is preferably 50 weight % or higher. For example, it may be 80 to 100 weight %. Ethylene or a comonomer may be a compound derived from fossil resources such as petroleum or may be a compound derived from biomass such as plants.

A material for forming the film may contain an additive other than a resin. An additive may be arbitrarily added to the sealant layer, the base material layer, or other layers. An additive is not particularly limited. Examples of an additive include an antioxidant, a lubricant, an anti-blocking agent, a flame retardant, a UV absorber, a light stabilizer, an anti-static agent, a coloring agent, and a cross-linking agent. A material for forming the film may be one kind of polyethylene-based resin or may be a blend of two or more kinds of polyethylene-based resin.

One body member 3 is disposed on each of the front and rear sides of the packaging bag 10. The front and rear body members 3 of the packaging bag 10 may be formed to have the same planar shape as each other.

On a side above the folding line 4a, the body seal portions 1 are formed on the left and right sides of the packaging bag 10. In the body seal portions 1, the inner surfaces of the front and rear body members 3 are joined to each other along left and right circumferential edge portions 11.

In an unsealed portion 5 between the body seal portions 1 in the lateral direction of the packaging bag 10, the front and rear body members 3 are not joined to each other, and a space that can accommodate a content is formed.

The bottom member 4 is sandwiched between the front and rear body members 3 while having the folding line 4a on the upper side. In plan view, the folding line 4a becomes an upper end of the bottom member 4.

On a side below the folding line 4a, the bottom seal portion 2 in which the inner surface of the bottom member 4 is joined to the inner surfaces of the body members 3 is formed. In the bottom seal portion 2 on the front side, a lower portion 4b and side portions 4c of a part disposed on a side in front of the folding line 4a in the bottom member 4 are joined to the body member 3 on the front side.

In the bottom seal portion 2 on the rear side, the lower portion 4b and the side portions 4c of a part disposed on a side behind the folding line 4a in the bottom member 4 are joined to the body member 3 on the rear side.

In the unsealed portion 5 surrounded by the lower portion 4b and the side portions 4c of the bottom member 4, the bottom member 4 is not joined to the body members 3, and a space that can accommodate a content is formed.

Boundary portions 2a of the bottom seal portion 2 with respect to the unsealed portion 5 have a downward convex shape in central portions 2b of the packaging bag 10 in the lateral direction.

The shapes of the boundary portions 2a can be set along the shape of a region in which the lower portion 4b and the side portions 4c of the bottom member 4 are joined to the body members 3. It is preferable that the boundary portions 2a be a curve that is smoothly curved.

Intersections P between the body seal portions 1 and the bottom seal portion 2 are parts where the folding line 4a of the bottom member 4 is sandwiched between the body members 3 and is joined.

In the body seal portions 1, two films overlap each other in order to join the front and rear body members 3 to each other. In contrast, in the bottom seal portion 2, four films overlap each other in order to join the mountain-folded bottom member 4 between the front and rear body members 3.

For this reason, a step is generated at the intersections P due to a change in the number of overlapping films. In addition, when the bottom member 4 is unfolded forward and rearward centering on the folding line 4a, the bottom member 4 turns while having the intersections P as fulcrums.

As illustrated in FIG. 1, the boundary portions 2a of the bottom seal portion 2 with respect to the unsealed portion 5 have a convex shape toward the upper side of the packaging bag 10 in side end portions 2c near parts that come into contact with the body seal portions 1. In plan view, inflection portions 2d in which the boundary portions 2a substantially have a linear shape may be present between the side end portions 2c and the central portion 2b.

In any of the left and right side portions 4c, if an extension line L of the inflection portion 2d is drawn, it intersects the body seal portion 1 on the same side as the side portion 4c on the side above the folding line 4a, and an intersecting point between the extension line L and the body seal portion 1 is away from the intersection P to the upper side. When an inflection point is taken as a representative of the inflection portion 2d, the extension line L of the inflection portion 2d may be a tangential line at the inflection point. It is preferable that the intersecting point between the extension line L and the body seal portion 1 be away from the intersection P by 5 mm or longer.

Regarding this distance, the position of the intersecting point need only be within a range of widths of the body seal portions 1. For example, the position thereof may be a position on the uppermost side, a position on the lowermost side, or a position in a central portion of the body seal portion 1 in a width direction.

When the bottom member 4 is unfolded forward and rearward, the packaging bag 10 can stand by itself while having the bottom member 4 as the lower side in a vertical direction. As illustrated in FIG. 2, when a state in which the bottom member 4 is unfolded forward and rearward is viewed from the lower side of the packaging bag 10, the central portions 2b of the bottom seal portion 2 are likely to be unfolded forward and rearward, but the side end portions 2c of the bottom seal portion 2 are unlikely to be unfolded forward and rearward because they are close to the body seal portions 1.

In addition, when the packaging bag 10 is filled with a content, the load of the content acts in a direction in which parts between the body members 3 and the bottom member 4 are spread along the boundary portions 2a. For this reason, stress in a disjoining direction is generated in parts close to the boundary portions 2a of the bottom seal portion 2 or parts close to the intersections P of the body seal portions 1.

In packaging bags in the related art, a film for forming the body members 3 or the bottom member 4 has a sealant layer of PE or the like and a base material of PET or the like. For this reason, the sealant layer firmly joins films to each other and the base material of PET or the like enhances the mechanical strength of the films so that disjoining or the like is curbed. However, when the packaging bag 10 is formed using a film made of only a polyethylene-based resin without using a base material of PET or the like, the mechanical strength of the films becomes lower.

In packaging bags in the related art, the boundary portions 2a of the bottom seal portion 2 with respect to the unsealed portion 5 entirely have a convex shape toward the lower side of the packaging bag or substantially have a linear shape near the side end portions 2c. For this reason, stress generated in the body members 3 or the bottom member 4 with respect to the load of a content is likely to concentrate near the intersections P. Moreover, since the intersections P are at positions close to corner portions 12 on the lower side of the packaging bag, it is likely to be affected by an impact due to a drop. For this reason, from the viewpoint of securing impact resistance of a packaging bag, there are limitations on the material of a film, and it is difficult to realize a mono-material film.

In the packaging bag 10 of the embodiment, the shapes of the boundary portions 2a in the side end portions 2c of the bottom seal portion 2 are convex shapes toward the upper side of the packaging bag 10. Accordingly, the impact resistance of the packaging bag can be improved, and disjoining, damage to the bag, or the like can be curbed. For this reason, the packaging bag is unlikely to break even when it is dropped, and thus providing a packaging bag exhibiting excellent durability.

According to the embodiment, the bottom seal portion 2 near the intersections P in the side end portions 2c has a wider width than that in the related art. In addition, regarding a region in which the bottom member 4 turns centering on the folding line 4a, parts near the central portions 2b of the bottom seal portion 2 are also similar to those in the related art, but the unsealed portion 5 near the side end portions 2c of the bottom seal portion 2 is narrower than that in the related art.

For this reason, when the bottom member 4 is unfolded forward and rearward in the packaging bag 10 centering on the folding line 4a and parts between the body members 3 and the bottom member 4 are spread centering on the boundary portions 2a, movement of the body members 3 and the bottom member 4 can be curbed compared to that in the related art in the side end portions 2c of the bottom seal portion 2.

When a load of a content acts on the body members 3 and the bottom member 4, since the unsealed portion 5 has a wide width in parts near the central portions 2b of the bottom seal portion 2, inflation of the body members 3 also becomes large, and the distribution of the content is also dispersed.

When the side end portions 2c of the bottom seal portion 2 tend to be unfolded forward and rearward in the packaging bag 10 in accordance with inflation of the unsealed portion 5 in the central portions 2b of the bottom seal portion 2, the inflation is comparatively large on a side above the extension lines L of the inflection portions 2d, but the inflation is likely to be curbed on a side below the extension lines L of the inflection portions 2d.

For this reason, a region to which a force is applied when the unsealed portion 5 of the body members 3 inflates is likely to be dispersed to a side above the extension lines L of the inflection portions 2d. In a region on a side below the extension line L, a content is unlikely to enter the unsealed portion 5, and deformation of the body members 3 or the bottom member 4 is curbed.

As a result, even if an impact such as a drop is applied to the corner portion 12 on the lower side of the packaging bag 10, concentration of stress near the intersections P on a side below the extension line L is mitigated, and disjoining, damage to the bag, or the like can be curbed.

As illustrated in FIG. 2, in the left and right side end portions 2c of the bottom seal portion 2, it is preferable that the bottom member 4 be unlikely to be opened forward and rearward. Although it is not particularly illustrated, a cutout portion or a penetration hole may be formed in the bottom member 4, and the front and rear body members 3 may be joined to each other through the cutout portion or the penetration hole.

The cutout portion may come into contact with the left and right circumferential edge portions 11. The penetration hole may be formed at a position away from the left and right circumferential edge portions 11.

In addition, the outer surfaces of the bottom member 4 may be locally joined to each other. In this case, the cutout portion or the penetration hole of the bottom member 4 can also be omitted. Regions in which the outer surfaces of the bottom member 4 are joined to each other may be at positions where they come into contact with the left and right circumferential edge portions 11 or may be at positions away from the left and right circumferential edge portions 11.

Dimensions of the packaging bag 10 are not particularly limited. However, for example, the height in the up-down direction may be approximately 100 mm to 500 mm, the width in the lateral direction may be approximately 70 mm to 300 mm, and the filling amount may be approximately 100 cm$^3$ to 5,000 cm$^3$.

The state of a content includes a fluid such as a liquid, a powder, granules, and the like. The kind of content is not particularly limited. However, the kind includes detergents, drugs, cosmetics, medical supplies, beverages, seasoning, ink, paint, fuel, and the like.

In order to fill the packaging bag 10 with a content, a part of a filling port 6 may open at circumferential edges of the body members 3. The packaging bag 10 illustrated in FIG. 2 is in a state in which the front and rear body members 3 are joined to each other and the filling port 6 is closed. The filling port 6 before filling may be in a state in which an unsealed portion opens between the front and rear body members 3.

The filling port 6 illustrated on the lower side in FIG. 2 shows a case of being formed in the upper portion of the packaging bag 10 as an example. However, the position of the filling port 6 is not particularly limited, and the filling port 6 may be formed in any of the left and right circumferential edge portions 11.

In order to pour out a content from the packaging bag 10, a spout 7 may open at the circumferential edges of the body members 3. The direction of the spout 7 is not particularly limited, and it may be an upward direction of the packaging bag 10, any direction in the lateral direction, or an oblique direction.

On the lower side in FIG. 2, the spout 7 in which a flow channel 7a is formed in an obliquely upward direction of the packaging bag 10 is illustrated as an example. Around the spout 7, flow channel forming seal portions 7b are formed on both sides of the flow channel 7a.

The spout 7 illustrated in FIG. 2 is in an open state. However, it is preferable that the spout 7 be in a closed state when the content is not being poured out.

On a tip side of the flow channel 7a before opening, a flow channel closing seal portion 7c closing the flow channel 7a may be formed while being connected to the flow channel forming seal portions 7b. The flow channel forming seal portions 7b and the flow channel closing seal portion 7c can be formed by joining the inner surfaces of the front and rear body members 3 to each other.

When the spout 7 is opened, in order to facilitate separation of the flow channel closing seal portion 7c, an opening guide portion (not illustrated) may be formed by providing a cutout (notch) in an end portion, a half-cut groove in the film, or the like.

The opening guide portion of the spout 7 may be omitted, and the spout 7 can also be opened using a tool such as scissors. When an opening guide portion is formed in the spout 7, it is easily opened using hands and fingers without using a tool.

A hard member for retaining the shape of the flow channel 7a in a tubular shape may be joined to the spout 7. Examples thereof include a shape-retaining member (not illustrated) made of a polyethylene-based resin molded into a tube shape, a straw shape, or the like. The shape-retaining member may be attached to the inner surfaces of the body members 3 in the flow channel 7a or may be attached to the outer surfaces of the body members 3.

Hereinabove, the present invention has been described on the basis of a preferable embodiment. However, the present invention is not limited to the embodiment described above, and various modifications can be made within a range not departing from the gist of the present invention.

REFERENCE SIGNS LIST

L Extension line
P Intersection
1 Body seal portion
2 Bottom seal portion
2a Boundary portion
2b Central portion of bottom seal portion
2c Side end portion of bottom seal portion
2d Inflection portion
3 Body member
4 Bottom member
4a Folding line
4b Lower portion of bottom member
4c Side portion of bottom member
5 Unsealed portion
6 Filling port
7 Spout
7a Flow channel
7b Flow channel forming seal portion
7c Flow channel closing seal portion
10 Packaging bag
11 Left and right circumferential edge portions
12 Corner portion on lower side

The invention claimed is:

1. A packaging bag comprising in which
a bottom member folded in half along a folding line and sandwiched between a pair of body members,
body seal portions formed by joining inner surfaces of the pair of body members to each other along left and right circumferential edge portions of the packaging bag, the body seal portions formed on a side above the folding line,
a bottom seal portion formed by joining an inner surface of the bottom member to the inner surfaces of the pair of body members, the bottom seal portion formed on a side below the folding line, and
an unsealed portion surrounded by the body seal portions and the bottom seal portion, the unsealed portion configured to accommodate a content,
wherein the pair of body members and the bottom member are formed using a film made of only a polyethylene-based resin,
wherein the bottom seal portion comprises a boundary portion with respect to the unsealed portion,
wherein the bottom seal portion further comprises a central portion, side end portions having parts in contact with the body seal portions, and inflection portions between respective side end portions and the central portion, and
wherein the boundary portion has a convex shape toward an upper side of the packaging bag near the parts in contact with the body seal portions,
wherein an intersection is defined between the body seal portions and the bottom seal portion as a part where the folding line of the bottom member is sandwiched between the pair of the body members, wherein a tangential extension line of each of the inflection portions intersects a respective one of the body seal portions on a respective one of the left and right circumferential edge portions above the folding line, wherein an intersecting point between the tangential extension line and the respective one of the body seal portions is located away from the intersection toward the upper side of the packaging bag by at least 5 mm, wherein a height in a vertical direction of the packaging bag is 100 mm to 500 mm, wherein a width in a horizontal direction of the packaging bag is 70 mm to 300 mm, and wherein a filling capacity of the packaging bag is 100 cm$^3$ to 5,000 cm$^3$.

2. The packaging bag according to claim 1, wherein the film is a lamination film having a sealant layer laminated on an inner surface of the film, and a base material layer laminated on an outward side of the sealant layer in a thickness direction of the film, and wherein the sealant layer is formed of an un-stretched polyethylene-based resin, and the base material layer is formed of a stretched polyethylene-based resin.

3. The packaging bag according to claim 1, wherein the boundary portion of the bottom seal portion with respect to the unsealed portion has a convex shape toward the lower side of the packaging bag in a central portion of the packaging bag in the horizontal direction.

4. The packaging bag according to claim 1, wherein in the bottom member, outer surfaces of the bottom member are joined to each other in the left and right circumferential edge portions of the packaging bag.

* * * * *